Feb. 10, 1942.  S. INGILDSEN ET AL  2,272,299
MOTOR VEHICLE TOP
Filed Oct. 7, 1940  3 Sheets-Sheet 3

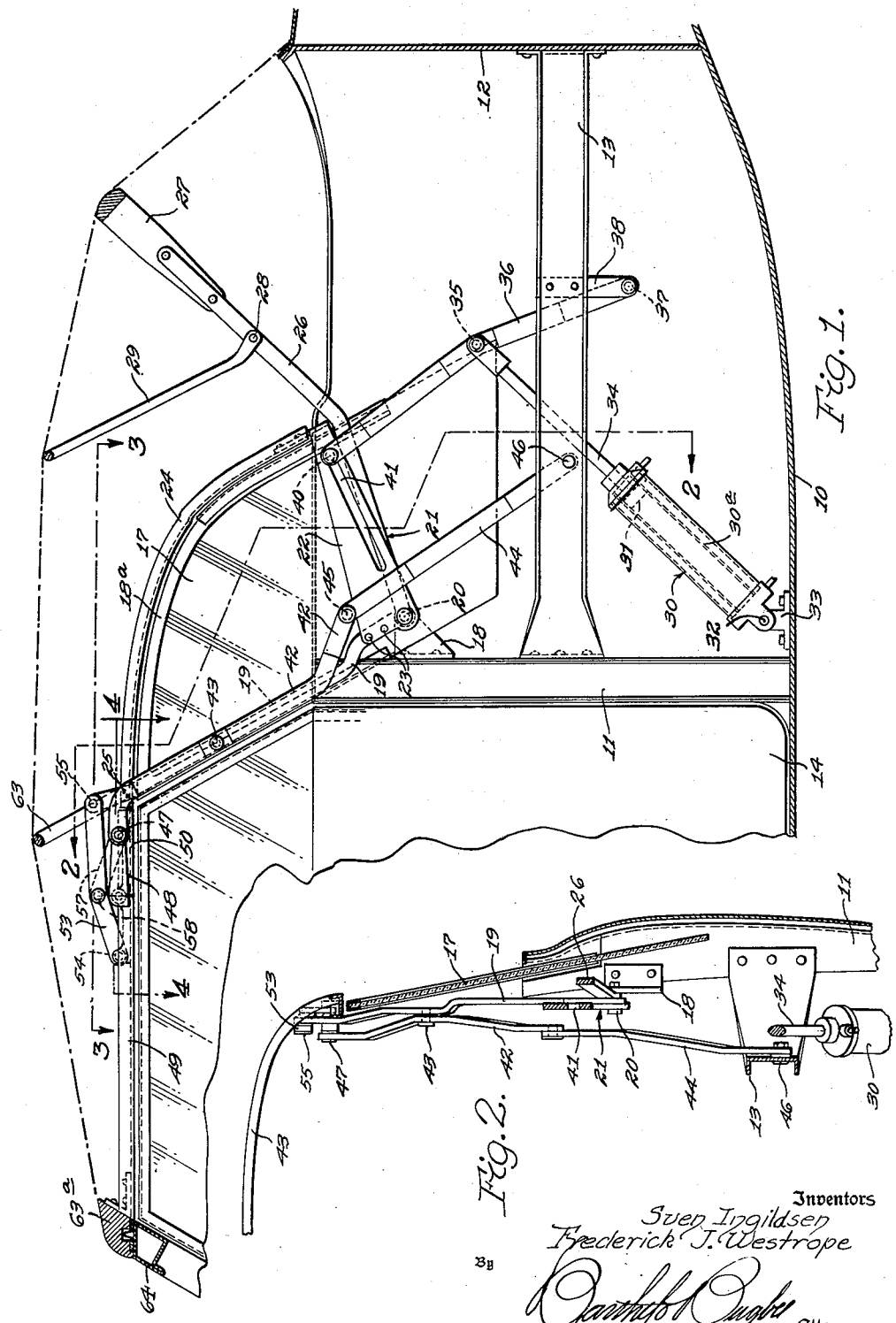

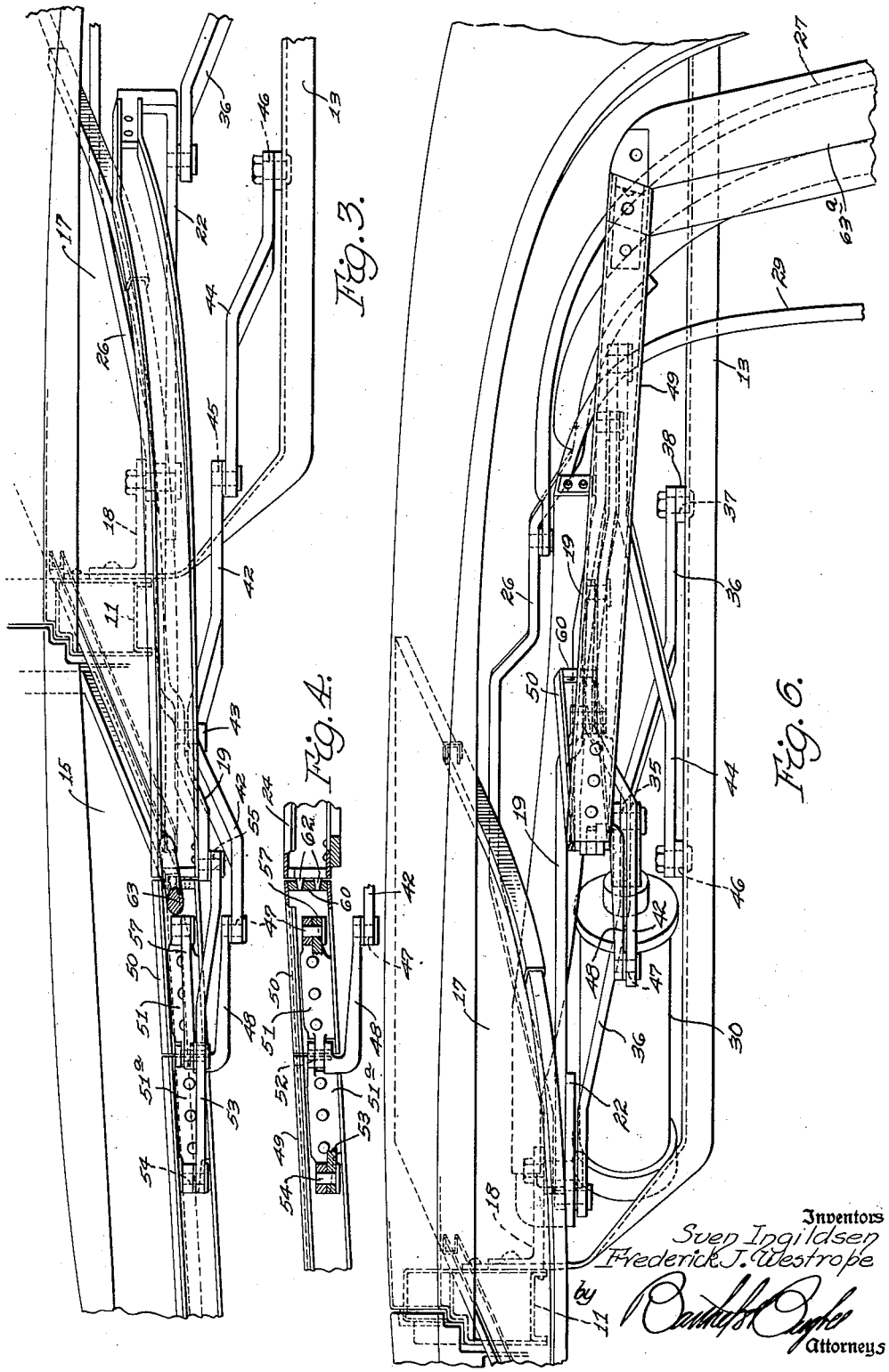

Inventors
Sven Ingildsen
Frederick J. Westrope
By
Attorneys

Patented Feb. 10, 1942

2,272,299

UNITED STATES PATENT OFFICE 2,272,299

MOTOR VEHICLE TOP

Sven Ingildsen, Detroit, and Frederick J. Westrope, Pleasant Ridge, Mich., assignors to F. L. Jacobs Company, Detroit, Mich., a corporation of Michigan Application October 7, 1940, Serial No. 360,064

7 Claims. (Cl. 296—107)

This invention relates generally to motor vehicles and more particularly to foldable tops therefor.

It is an object of the present invention to provide a novel, articulated, foldable top structure for a motor vehicle body of the type having rear side windows.

Another object of the invention is to provide a novel, articulated, foldable top structure for a motor vehicle body having rear side windows and one which may be raised or lowered irrespective of whether the window glasses are in raised or lowered positions.

A further object of the invention is to provide a new and improved articulated top frame structure of a character such that when the top is in raised position, part of the top structure forms the rear side window frames of the vehicle body.

Other objects of the invention will become apparent from the following detailed description taken in connection with the accompanying drawings in which:

Figure 1 is a fragmentary view shown in longitudinal vertical section of one side of a motor vehicle body and showing our improved foldable top in raised position.

Figure 2 is a cross section of the body and top taken along the line and in the direction of the arrows 2—2 of Figure 1.

Figure 3 is a top plan view of one side of the body and top taken along the line 3—3 of Figure 1.

Figure 4 is a view showing certain details of the top and taken along the line 4—4 of Figure 1.

Figure 6 is a top plan view of the structure of Figure 5.

Figure 5:
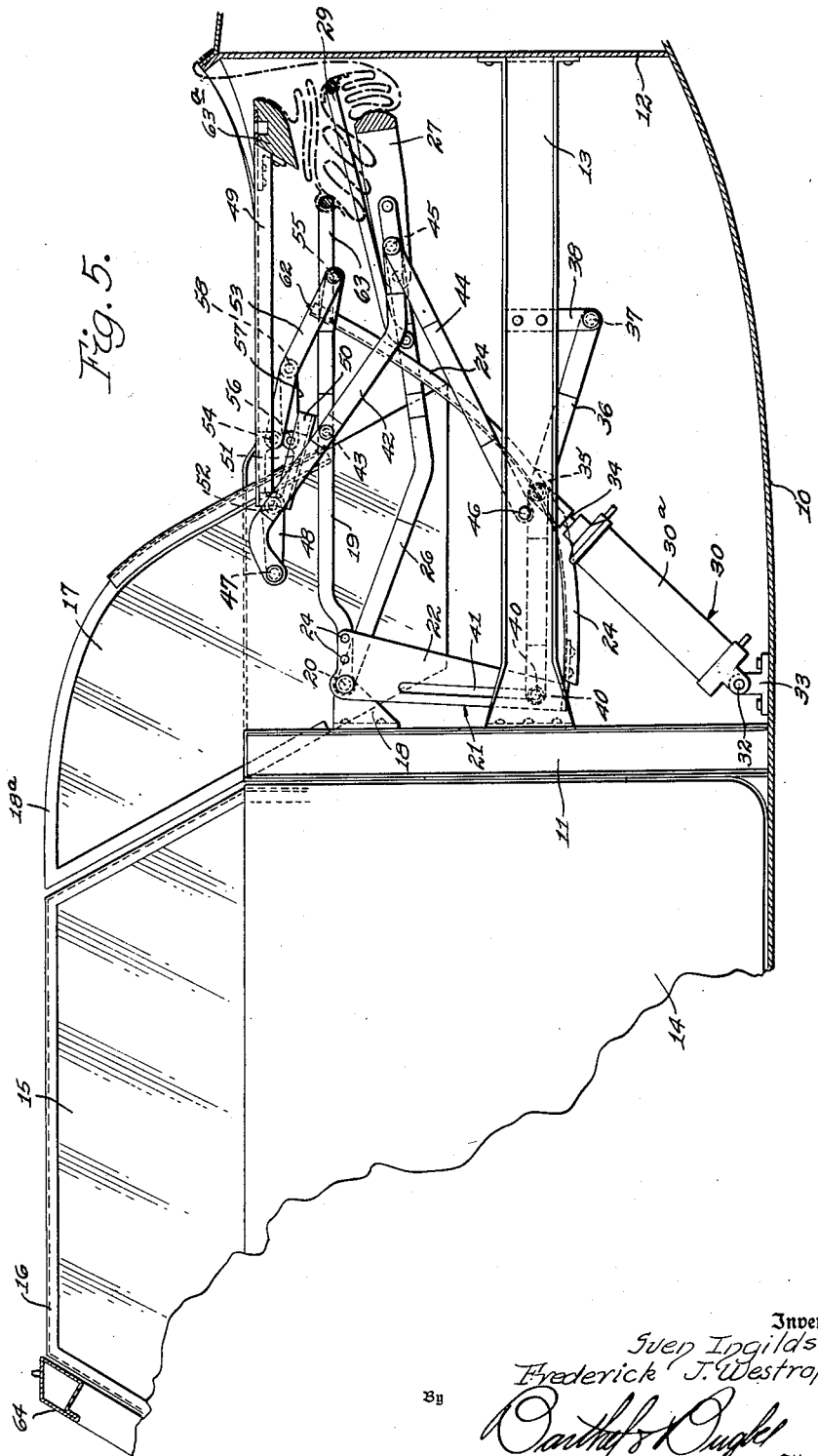
Figure 5 is a view similar to Figure 1 but showing the top in lowered position.

Referring to the drawings by characters of reference, the motor vehicle body shown is of the so-called convertible type and at opposite sides thereof includes longitudinally extending floor sills 10 from which oppositely-disposed, intermediate, side posts or pillars 11 and rear pillars 12 extend. The intermediate and rear pillars of corresponding sides of the body are preferably rigidly secured together intermediate their ends by longitudinally-extending, channel reinforcing members 13. Each side of the body is provided with a front door 14 which extends upwardly substantially to the upper ends of the pillars 11. In each of the doors 14 a window is provided which is closable by a vertically-movable pane of glass 15 which is guided in suitable channels and which may be raised or lowered by any suitable window operating mechanism. Rearwardly of the front door window, the body is provided, at opposite sides thereof, with vertically-movable panes of glass 17 to close rear side or so-called quarter windows. The window panes 15 and 17 are provided with edge frames 16 and 18ª respectively. The mechanisms for raising and lowering the windows has not been shown or described since such mechanisms are well known in the art and form no part of the present invention.

The articulated top and associated structures at each side of the body are alike, and therefore it is deemed necessary that only the top structure at one side of the body be described in detail. Rigidly secured to the center or intermediate pillar 11, adjacent the upper end thereof, there is a rearwardly-extending bracket 18 to which one end of a lever 19 is pivoted, as at 20. The lever 19 forms one or the front side of a rigid frame, designated in general by the numeral 21, which frame is movable about the pivot 20 and is swung to a raised position, Figure 1, when the top is raised. In this raised position, the frame side member or lever 19 also serves as a continuation of the center pillar 11. The frame 21 includes an elongated, plate-like base member 22 which is pivoted adjacent one end thereof to the pivot pin 20, adjacent which the member 22 is rigidly secured to the lever 19 by rivets 23 or these parts may be rigidly secured together by any other suitable means. To the other end of the base member 22 there is riveted one end of a frame member 24 having its other end rigidly secured as at 25 (Fig. 1) to and adjacent the outer end of the lever 19, thus providing a three-cornered window frame. As shown, the channel frame member 24 is bowed or curved outwardly to conform in contour to the curved edge of the window glass. A rear cross bow 26 has its opposite ends rigidly secured respectively to ends of arms 27, the other ends of which are respectively pivoted on the pins 20 at opposite sides of the body, and carried by and pivoted to the arms 22, as at 28, there is an intermediate cross bow 29.

Preferably, the frame 21 is raised and lowered automatically by a power element 30 which may comprise a hydraulic cylinder 30ª containing a reciprocable piston 31. The cylinder 30ª is pivoted at its lower end, as at 32, to a bracket 33 which is rigidly secured to the body sill 10. Integral with the piston 33, a connecting rod 34 is pivotally connected at its outer end by a pin 35 to and intermediate the ends of an operating lever 36, one end of which is pivoted, as at 37, to a bracket 38 which is rigidly secured to the body frame member 13. Secured in and adjacent the other or free end of the lever 36 there is a laterally extending pin 40 which engages in a slot 41 provided in and extending longitudinally of the base member 21 of the frame, thus operatively connecting the frame 21 to the power element 30.

A link 42 is carried by the frame 21 and the link 42 is pivoted intermediate its ends by a pin 43 to and intermediate the ends of the lever or frame side member 19. One end of the link 42 is connected pivotally to one end of an arm 44 by a pivot pin 45, the other end of which arm is pivoted by a pin 46 to the body frame member 13. The other end of the link 42 is connected by a pivot pin 47 to an integral extension or arm 48 of a preferably channel-shaped top frame member 49 which, in the raised position of the top, extends longitudinally of the body along one side thereof. A channel-shaped extension member 50 is provided for the frame member 49 and is movable relatively thereto in raising and lowering the articulated top structure. The extension member or arm 50 is rigidly secured to a bracket 51 which at one end of the extension 50 is pivoted, as at 52, to the arm 48, the arm 48 being integral with a bracket 51a which is rigidly secured to the frame member 49. To the bracket 51a one end of a link 53 is pivoted by a pin 54, the other end of the link 53 being pivotally connected by a pin 55 to the outer end of the frame member or lever 19. Intermediate the ends of the extension member 50, the bracket 51 which is rigidly secured thereto is pivotally connected by a pin 56 to one end of a link 57 having its other end pivotally connected by a pin 58 to and intermediate the ends of the link 53. Rigidly secured in and to the channel extension 50 at the rear end thereof is a metallic block 60, see Figure 4, provided preferably with a pair of spaced bores to receive complementary pins 62 integral with the upper end of the frame member 24, thus, to connect releasably the parts together and hold them against rattling.

Rigidly secured to the frame or lever member 19 there is a front bow 63 and rigidly secured to the front ends of the top member 49 there is a cross member 63a which, in the raised position of the top, seats on and is suitably detachably secured to the windshield header 64. The top covering, indicated by the dot and dash line, is attached to the front cross member 63a, to the cross bows 63, 29 and 27, and to the rear of the body. Also the top covering is attached to the frame members 49 and the window frame members 24.

As previously mentioned, the articulated side frame structures of the top, above described, are alike for both sides of the body and preferably two of the power elements 30 are provided, one for each of the side frame structures. In raising the top, the power element 30, through the connecting rod 34, pivots the arm 36 clockwise, facing Figure 5, which causes the frame 21 to swing upwardly or counter-clockwise, during which movement the pin 40 moves in and along the slot 41 of the frame base 22 to permit free movement of the frame 21 relative to the arm 36. The link 42, member 49, extension 50 and the interconnecting links 42 and 53 move with the frame 21 since they are carried thereby and swing or pivot about their respective fulcrums during the upward swinging movement of the frame 21. For example, the link 42 being connected at 45 to the arm 44 is caused to pivot counter-clockwise as the frame 21 swings upwardly and this movement of link 42 is imparted to member 49 which is also caused to swing clockwise as it moves forwardly. The extension member 50 moves upwardly with the frame 21 and with member 49 and finally assumes a position above the body door and rearwardly of the member 49. Just prior to the frame 21 reaching its raised position, the pins 62 carried thereby engage in the bored recesses in the block 60 of the extension 50, thus connecting the parts together to prevent rattling noises. The rear bow 27 and the intermediate bow 29 carried thereby are raised by and when the top covering is drawn forward by the bow 63. When the top is raised the parts assume the positions shown in Figure 1, in which positions the frame 21 serves, in addition to serving as part of the articulated top structure, to frame a rear side or so-called quarter window, and the frame side member 19 serves as an extension of the body pillar 11. In lowering the top, the power element 30 swings the arm 36 down or counter-clockwise, which causes the frame 21 to swing down or clockwise. As the frame swings down clockwise, the link 42 is caused to rotate counter-clockwise, which swings member 49 clockwise, these actions all taking place during movement of the frame 21 downwardly or to its retracted position. The rear bow 26 first comes to rest with the intermediate bow 29 folded or swung down thereagainst, after which the other parts finally assume the positions shown in Figure 5.

While we have shown and described our invention in detail, it is to be understood that the same is to be limited only by the appended claims for many changes may be made without departing from the spirit and scope of our invention.

What we claim is:

1. In an articulated side frame of a foldable top for a motor vehicle body having a rear side window, a first movable member having a raised position and a lowered position, said member in its raised position providing a part only of a frame for the rear side window, a second movable member connected to said first movable member and having a raised position and a lowered position, said second movable member in its raised position providing another part only of the window frame and cooperating with said first movable member in forming together a part only of the window frame, said first and second movable members extending around the upper and lateral edges only of said rear side window and avoiding the bottom edge thereof, and means for moving said first member and said second member as a unit upward and away from said rear side window whereby to enable said rear side window to remain raised while lowering said foldable top.

2. In an articulated side frame of a foldable top for a motor vehicle body having a center pillar and a rear side window, a first movable frame member pivoted adjacent one side of the body and having raised and lowered positions, said first movable member in its raised position providing an upper continuation of the body pillar and also forming the front edge frame for a rear side window, a second member pivoted adjacent the side of the body and having raised and lowered positions, said second movable frame member in its raised position forming the rear edge frame for the rear side window, said first and second movable members extending around the upper and lateral edges only of said rear side window and avoiding the bottom edge thereof, and means for moving said members together as a unit upward and away from said rear side window whereby to enable said rear side window to remain raised while lowering said foldable top.

3. In an articulated side frame of a foldable top for a motor vehicle body, a frame pivoted to the body, said frame being raised to swing from a retracted position to a raised position and in said raised position framing a rear side window of the body, an elongated member extending longitudinally of the body and forwardly of said frame when the frame is in raised position, releasable retainer means on said frame and on said member and cooperable upon raising of said frame, said member being carried by said frame and arranged to pivot relatively thereto during raising and lowering of said frame, a link connecting said frame and said member together, and a second link separate from said first-named link and connecting said member to said frame.

4. In an articulated side frame of a foldable top for a motor vehicle body, a lever arranged to swing from a lowered position to a raised upright position when the top is raised, an arm having a fulcrum below the fulcrum of said lever, a member extending forwardly of said lever when said lever is in raised position, a link pivoted intermediate its ends to said lever and pivotally connected adjacent opposite ends respectively to said member and to said arm, and a second link connecting said member and said lever.

5. In an articulated side frame of a foldable top for a motor vehicle body having a center pillar, a frame for a rear side window, said frame having a raised position and having a lowered position, one side of the frame in the raised position thereof providing an extension for the pillar, a member extending longitudinally of the body and forwardly of said one side of the frame when the frame is in raised position, an arm fulcrumed on the body, a link pivoted intermediate its ends to said one side of the frame, said link adjacent its ends being pivoted respectively to said member and to said link, a link having one end connected to said one side of the frame above the pivot of said first-named link and having its other end connected to said member forwardly of the pivotal connection between said member and said first named link, and means to raise and lower said frame.

6. In an articulated side frame structure of a foldable top for a motor vehicle body, a lever pivoted to the body and arranged to swing upwardly to a raised position in raising the top, a member arranged to extend longitudinally of the body and forwardly of said lever when the top is in raised position, said member being movable with and relative to said lever, an extension member for said first-named member and extending rearwardly therefrom, said extension member and said first-named member being movable relatively to each other in raising or lowering the top, a link pivotally connecting said lever to the rear end of said first-named member, a second link having one end connected to said first-named member rearwardly of the connection between said first-named member and said first-named link and having its other end connected to said lever above said first-named link, and a link connecting said extension to said second-named link.

7. In an articulated side frame structure of a foldable top for a motor vehicle body, a three-cornered frame fulcrumed adjacent one side of the body, said frame arranged to swing upwardly from a lowered position to a raised position to frame a side rear window, an operating lever fulcrumed adjacent the side of the body and operatively connected to said frame, an arm having a fulcrum forwardly of the fulcrum of said lever, a link pivoted intermediate its ends to one side of said frame, one end of said link being connected to said arm, a member extending longitudinally of the body and forwardly of said frame when said frame is in raised position, said member being connected adjacent its rear end to the other end of said link, an extension for said member and disposed rearwardly thereof when said frame is in raised position, a second link connecting said member and said frame together, and a link having one end connected to said extension and the other end connected to said second-named link intermediate the ends thereof.

SVEN INGILDSEN.
FREDERICK J. WESTROPE.